United States Patent
Cramblitt et al.

(10) Patent No.: US 7,710,545 B2
(45) Date of Patent: May 4, 2010

(54) SCANNED LASER DETECTION AND RANGING APPARATUS

(75) Inventors: Robert Merrill Cramblitt, Wexford, PA (US); David Greenwald, Pittsburgh, PA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/030,603

(22) Filed: Feb. 13, 2008

(65) Prior Publication Data

US 2009/0201486 A1 Aug. 13, 2009

(51) Int. Cl.
*G01C 3/08* (2006.01)
(52) U.S. Cl. .................................................... 356/4.01
(58) Field of Classification Search ........... 356/3.01–22
See application file for complete search history.

(56) References Cited

U.S. PATENT DOCUMENTS

| | | | | |
|---|---|---|---|---|
| 4,305,643 | A * | 12/1981 | Tosswill | 359/623 |
| 4,881,809 | A * | 11/1989 | Thierry | 356/5.05 |
| 5,467,122 | A | 11/1995 | Bowker et al. | |
| 6,836,285 | B1 * | 12/2004 | Lubard et al. | 348/31 |
| 7,437,985 | B2 * | 10/2008 | Gal | 89/1.11 |
| 2004/0130702 | A1 * | 7/2004 | Jupp et al. | 356/5.01 |
| 2006/0132752 | A1 * | 6/2006 | Kane | 356/5.02 |
| 2007/0024840 | A1 * | 2/2007 | Fetzer et al. | 356/4.01 |

FOREIGN PATENT DOCUMENTS

| | | |
|---|---|---|
| EP | 1256816 | 10/2003 |
| GB | 2403614 A | 1/2005 |

OTHER PUBLICATIONS

Juberts et al., "Status report on next generation LADAR for driving unmanned ground vehicles", Mobile Robots XVII, Proceedings of SPIE vol. 5609, SPIE Bellingham WA, 2004, pp. 1-12.
"66—Laser Sensor", NIST Intelligent Systems Division RFQ #SB1341-07-RQ-0083, Feb. 26, 2007, pp. 1-4.

* cited by examiner

*Primary Examiner*—Thomas H Tarcza
*Assistant Examiner*—Luke D Ratcliffe
(74) *Attorney, Agent, or Firm*—Yee & Associates, P.C.; Clifford G. Cousins

(57) ABSTRACT

A method and apparatus for obtaining information about an environment having objects located around a vehicle. The laser detection and ranging system comprises a fan beam generation unit, a streak unit, a telescope, a switch, and a detector unit. The fan beam generation unit transmits a fan beam. The streak unit streaks a received beam generated in response to the fan beam to form a streaked beam. The telescope propagates the fan beam to a portion of the environment around the vehicle. The switch directs the fan beam generated by the fan beam generation unit through the telescope along an azimuth onto the environment around the vehicle and directing a response signal to the fan beam to the streak unit. The detector unit detects the streaked beam and generating range and angle data to generate an image of the environment.

18 Claims, 8 Drawing Sheets

SCANNED LASER DETECTION AND RANGING APPARATUS

BACKGROUND

1. Field

The present disclosure relates generally to detecting objects and in particular to a method and apparatus for identifying objects around a vehicle. Still more particularly, the present disclosure relates to a method and apparatus for mapping the environment around a vehicle.

2. Background

Unmanned ground vehicles (UGVs) are robotic platforms. These types of platforms are typically capable of operating outdoors and over a wide variety of terrain. Unmanned ground vehicles may be used as an extension of human capability and may function in place of where humans are located. These types of vehicles may be used to perform dull, dirty, and dangerous activities in both civilian and military situations. Unmanned ground vehicles may be controlled by a human operator at a remote location or through an autonomous process that may be executing in the vehicle or at a remote location.

With the operation of unmanned ground vehicles, an identification of the terrain around the vehicle is used to guide the vehicle. The information to identify the terrain may be provided through a three-dimensional light detection and ranging system, which is also referred to as a three-dimensional ladar sensor. A light detection and ranging system is a remote optical sensing system that measures scattered light to identify range and/or other information of a target.

Typically, the distance to an object or surface may be identified through laser pulses. The range to an object may be identified by measuring time delay between transmission of a pulse and detection of the reflected signal. In addition, the magnitude of the reflected signal may be measured and used to infer properties of the target, such as reflectance, texture and shape. The information identified from this type of system may be used to plan the movement of an unmanned ground vehicle.

Other technologies, such as modulated light emitting diode arrays, spot scanners, and flash detectors also may be used to identify the terrain around a vehicle. Modulated arrays are bulky and limited to operation at short ranges. Spot scanners are optically efficient, but are limited in scan speed. Flash detection also may be used, but their use may be limited by cost, optical efficiency, sampling requirements, or sampling system complexities.

Therefore, it would be advantageous to have an improved method and apparatus for sensing objects that overcomes the above described problems.

SUMMARY

The different advantageous embodiments provide a method and apparatus for obtaining information about an environment having objects located around a vehicle, particularly within a horizontal swath of view. In one advantageous embodiment, a laser detection and ranging system for a vehicle is present. The laser detection and ranging system comprises a fan beam generation unit, a streak unit, a telescope, a switch, and a detector unit. The fan beam generation unit is capable of transmitting a fan beam. The streak unit is capable of streaking a received beam generated in response to the fan beam to form a streaked beam. The telescope is capable of propagating the fan beam to a portion of the environment around the vehicle. The switch is capable of directing the fan beam generated by the fan beam generation unit through the telescope along an azimuth onto the environment around the vehicle and directing a response signal to the fan beam to the streak unit. The detector unit is capable of detecting the streaked beam and generating range and angle data to generate an image of the environment.

In another advantageous embodiment, an apparatus comprises a fan beam generation unit, a detector, a streak unit, and a data processing system. The fan beam generation unit is capable of transmitting a laser beam in a form of a fan onto an environment. The detector has a plurality of rows of sensors capable of detecting a response signal generated in response to transmitting the laser beam onto the environment. The streak unit is capable of projecting different portions of the response signal onto different rows of the detector in response to the different portions of the response signal being received at different times. The data processing system is capable of generating range and angle data from the response signal detected by the detector.

In still another advantageous embodiment, a method is present for forming an image terrain. A fan beam is transmitted onto a terrain. Responsive to receiving a return signal from the fan beam, the return signal, based on when each portion of the return signal is received, is shifted onto a two-dimensional sensor to identify angle and range information for the return signal from the fan beam.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
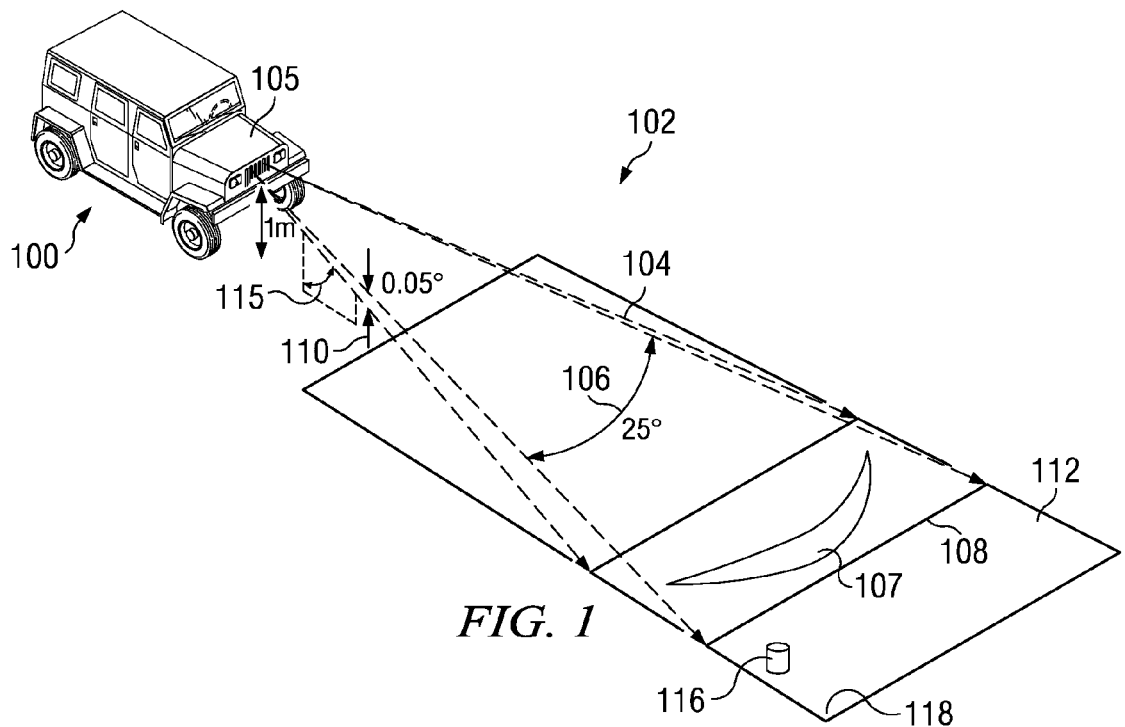
FIG. 1 is an illustration of an unmanned ground vehicle with a scanned fan beam three-dimensional laser detection and ranging system in which an advantageous embodiment may be implemented.

With reference now to the figures and in particular with reference to FIG. 1, an illustration of an unmanned ground vehicle with a scanned fan beam three-dimensional laser detection and ranging system is depicted in accordance with an advantageous embodiment. In this example, vehicle 100 is an unmanned ground vehicle that may detect terrain 102. In particular, vehicle 100 may identify and generate information about terrain 102. The terrain to be sensed in these examples extends from just above the horizon to below the horizon. Of course, alternative embodiments may include unmanned water vehicles navigating environments having other objects, vessels and/or landmasses in place of terrain for detection.

In detecting terrain 102, the distance of various objects may be identified. This distance is also referred to as a range. Further, the dimensions of these objects also may be identified by vehicle 100. These dimensions include, for example, without limitation, height and width of objects. The angular direction parallel to the horizon is referred to as azimuth. The angular direction perpendicular to the horizon is referred to as an elevation. The angular extent of an object in elevation is referred to as the height of an object. The angular extent of an object in azimuth is referred to as the width of an object. With this information, vehicle 100 may generate a map of terrain 102. In these examples, vehicle 100 may be used to collect information about terrain 102 at near horizontal elevation angles.

As depicted, vehicle 100 projects fan beam 104 with azimuthal width 106, which, in this example, is about 25 degrees azimuth and illuminates a ground width of about 13 meters to about 31 meters, depending on elevation pointing angle 115. As the elevation pointing angle 115 varies, field of regard 112 within an area of terrain 102 may be illuminated to obtain data about terrain 102. In this example, fan beam 104 may have a vertical extent 110 of about 0.05 degrees in elevation.

The propagation of a single laser pulse of this type of fan beam 104, transmitted at a particular elevation angle 115, illuminates a field of view footprint 108 in terrain 102 that is around 25 degrees azimuth by 0.05 degrees elevation in this example. The instantaneous illumination 107 of the ground by the laser for fan beam 104 may be around 25 degrees by 0.01 degrees in this example. Terrain 102 includes object 116, which is a raised object with respect to terrain 102. Each point detected or interrogated for object 116 has an elevation with respect to terrain 102.

In the advantageous embodiments, the return signal from fan beam 104 may be moved across the detector or the photosensitive elements of the detector may be moved with respect to the return signal for obtaining data for analysis.

In the advantageous embodiments, fan beam 104 is suited for viewing geometries in which the sensor used within vehicle 100 is looking close to the horizon. This type of situation is present with respect to vehicle 100 and also may be present for other vehicles, such as a ship or naval vessel or aircraft operating at low altitudes. In this example, fan beam 104 is projected from point 105 in vehicle 100 about one meter above terrain 102, and the elevation angles, such as elevation angle 115 of fan beam 104, are near 90 degrees. As a result, the field of regard 112 in depth directions may be large and may present both large variations in signal dynamic range and potentially large sampling volumes.

In the depicted examples, fan beam 104 may illuminate field of view 108 in which ground range variations are significantly less than in that of the total field of regard 112. For example, field of regard 112 may span around 40 meters in range, while field of view 108 may only span 1 meter.

Maritime use of fan beam 104 may have similar view geometries but with longer ranges. With this type of use, sampling requirements per laser pulse in the range depth dimension may be reduced relative to a flash illumination system which attempts to simultaneously measure the entire field of regard 112. Also, beneficial limitations in optical signal dynamic range variations may occur.

Another benefit of using fan beam 104 is that degradations due to off-axis back-scatter light can be greatly reduced relative to a flash illumination system. This type of reduction may be especially beneficial with a hazy environment, which is often encountered in maritime applications.

This use of fan beam 104, in the advantageous embodiments, may provide for desired measurement rates as well as lower costs and better utilization of transmitted energy as compared to currently used systems for obtaining information about terrain. For example, spot scanners tend to have low measurement rates. Three-dimensional flash approaches are quite costly in terms of the systems and may require many laser direction and ranging pulses to generate a scene or identified terrain. Further, other three-dimensional approaches may require large spatial volumes to be sampled leading to prohibited data processing requirements.

The different embodiments implement a mechanism to shift or streak light as part of a process to identify information about terrain. The streaking of light refers to deflecting or bending a line of light in the direction orthogonal to both the long dimension of the line and the direction of propagation of the line. A line of light refers to a beam of light that has a large width with respect to its height.

Currently, a fan beam may be used without a streak generator to make three-dimensional measurements by sampling each detector pixel at a very high rate, but the different advantageous embodiments recognize that this approach requires large amounts of costly data acquisition and processing hardware, and an array of custom high-speed detectors.

Figure 2:
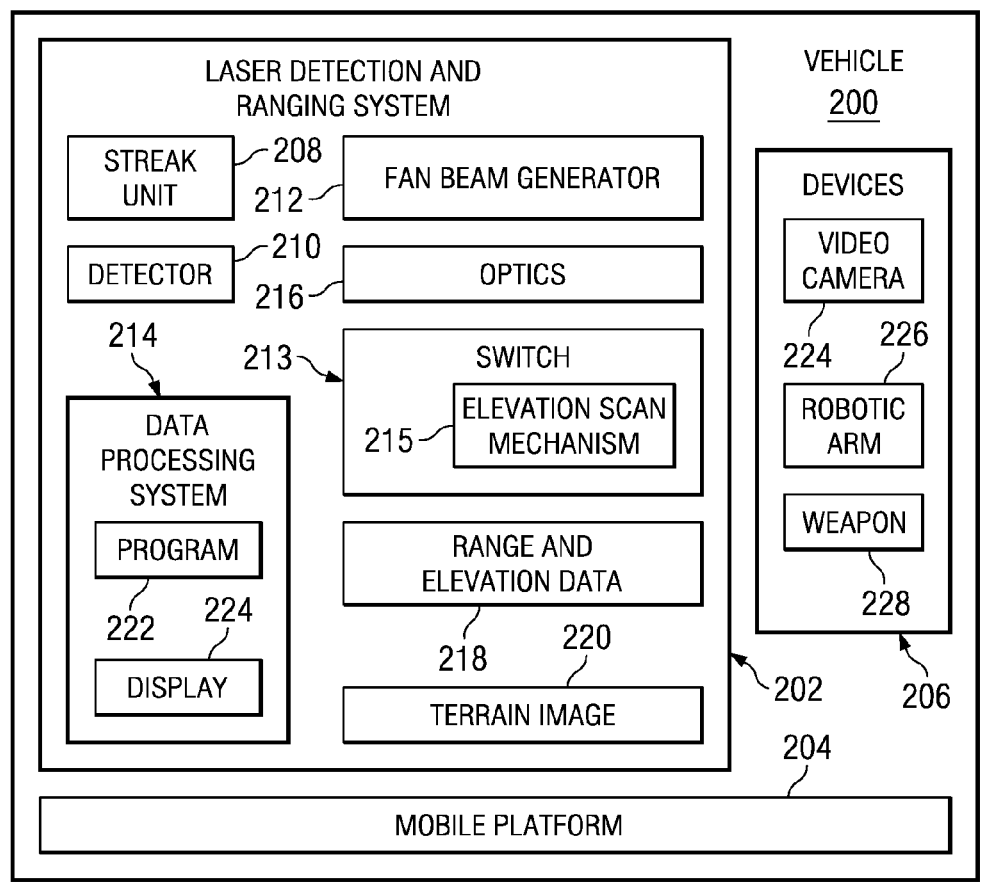
FIG. 2 is a block diagram of a vehicle with a laser detection ranging system in accordance with an advantageous embodiment.

Turning now to FIG. 2, a block diagram of a vehicle with a laser detection ranging system is depicted in accordance with an advantageous embodiment. In this example, vehicle 200 is an example of vehicle 100 in FIG. 1. Vehicle 200 may be, for example, a ground vehicle or a water vehicle or an air vehicle. When in the form of a ground vehicle, vehicle 200 may be a car, a truck, a tank, or some other suitable ground vehicle. In the form of a water vehicle, vehicle 200 may be, for example, a cargo vessel, a tanker, a sailing vessel, or some other suitable water vehicle. In the form of an air vehicle, vehicle 200 may be, for example, a helicopter, or some other suitable air vehicle. In this example, laser detection and ranging system 202 is mounted on mobile platform 204 of vehicle 200. Additionally, devices 206 also are mounted on mobile platform 204.

As illustrated, laser detection and ranging system 202 includes streak unit 208, detector 210, fan beam generator 212, switch 213, data processing system 214, and optics 216. Fan beam generator 212 generates a fan beam similar to fan beam 104 in FIG. 1. A fan beam, in these examples, is a beam of pulsed light that is transmitted. The fan beam may have an angular extent in azimuth that is much greater than its angular extent in elevation to form a fan. An example is fan beam 104 in FIG. 1 in which the width in azimuth is around 25 degrees and the width in elevation is around 0.01 degrees.

Optics 216 may contain any sort of optics, such as lenses, mirrors, and other suitable optical devices to direct a fan beam to the terrain as well as to detect a response signal generated in response to the transmission of the fan beam. Switch 213 may include elevation scan mechanism 215 which provides control of elevation angle 115 of FIG. 1.

A response signal may be detected through optics 216 in response to the transmission of the fan beam. Different portions of the response signal may be received at different times, based on how far away the terrain was when that portion of the fan beam hit the terrain.

As a result, a fan beam transmitted from laser detection and ranging system 202 may result in a first portion of the response signal being received at a later time as compared to a second portion of the response signal received from the fan beam reflecting off terrain that is closer to laser detection and ranging system 202. The portion of the response received at a later time is generated in response to the portion of the fan beam hitting terrain at a farther distance as compared to the first portion of the fan beam which hits the terrain at a closer distance with respect to laser detection and ranging system 202.

This response signal may be directed towards streak unit 208, which is capable of projecting the different portions of the response signal onto detector 210. Different portions of the response signal may be projected onto different rows in detector 210 based on when the different portions of the response signal are received, or different portions of the response signal may be detected within different rows in detector 210 through the shifting of those rows based on when the different portions of the response signal are received. In these examples, this projection includes streaking or shifting the response signal.

Detector 210 may be a plurality of pixels or light sensors arranged in a grid or rows. The data generated by detector 210 may be sent to data processing system 214 to identify range and intensity for each azimuth and elevation measurement angle. The range data is the distance from laser detection and ranging unit 202 to the terrain causing a particular portion of the response signal.

Data processing system 214 may use range, intensity, and angle data 218 to generate terrain image 220 using program 222. Terrain image 220 may be a two-dimensional image of a terrain in which intensity is a function of elevation and azimuth. In other embodiments, terrain image 220 may include information about distance of portions of the terrain imaged using laser detection and ranging system 202 in which range and intensity is a function of elevation and azimuth.

In these examples, data processing system 214 may take various forms. For example, data processing system 214 may be a computer containing a processor unit having one or more processors as well as memory, storage, and other components used to execute program 222 and may present images on display 232. Of course, data processing system 214 may take other forms, depending on the particular implementation. In some examples, data processing system 214 may be an application specific integrated circuit rather than a computer.

With this information, data processing system 214 may control various aspects of vehicle 200 using program 222. For example, data processing system 214 may execute program 222 to control the movement of mobile platform 204. Further, program 222 also may be used to control devices 206. These devices may include, for example, video camera 224, robotic arm 226, and weapon 228. Alternatively, program 222 may transmit this information to a remote operator (not shown) that may send back input to control mobile platform 204 and devices 206.

Figure 3:
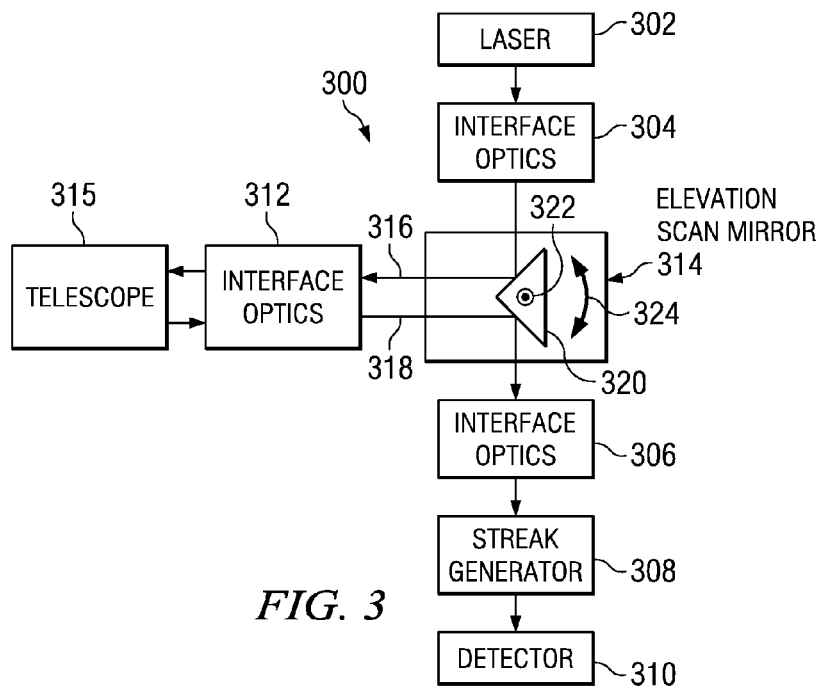
FIG. 3 is a diagram of a three-dimensional laser detection and ranging sensor in accordance with an advantageous embodiment.
Figure 4:
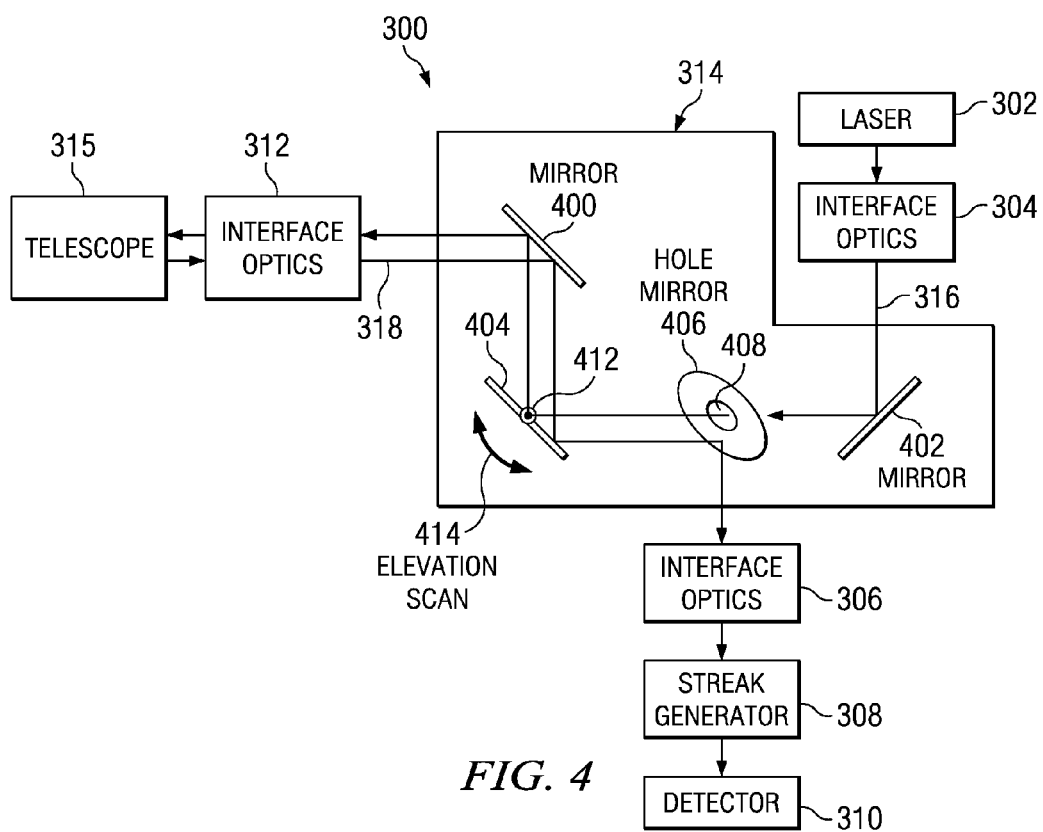
FIG. 4 is another diagram of a three-dimensional laser detection and ranging sensor in accordance with an advantageous embodiment.
Figure 5:
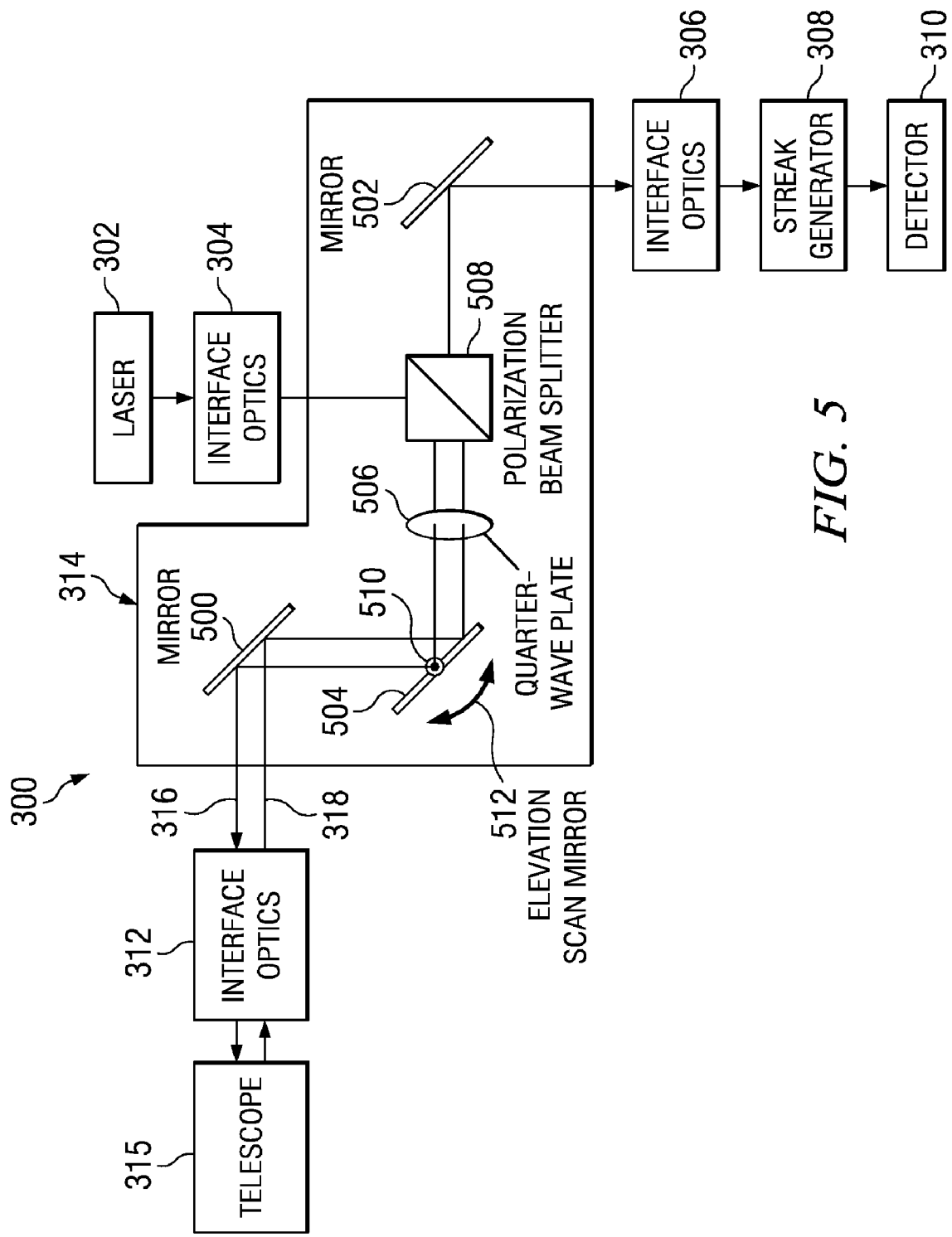
FIG. 5 is a further diagram of a three-dimensional laser detection and ranging sensor in accordance with an advantageous embodiment.

FIGS. 3-5 describe architectures that may be used to obtain information to generate a three-dimensional image of an object. With reference now to FIG. 3, a diagram of a three-dimensional laser detection and ranging sensor is depicted in accordance with an advantageous embodiment. In this example, sensor 300 includes laser 302, interface optics 304, interface optics 306, streak generator 308, detector 310, interface optics 312, switch 314, and telescope 315.

Sensor 300 is an example of components that may be found within laser detection and ranging system 202 in FIG. 2. Laser 302 and possibly interface optics 304 may be used to implement fan beam generator 212 in FIG. 2. Streak generator 308 may be implemented as streak unit 208 in FIG. 2. Detector 310 may be implemented as detector 210 in FIG. 2. Interface optics 304, interface optics 306, interface optics 312, and telescope 315 are examples of components that may be used to implement optics 216 in FIG. 2.

Laser 302 and interface optics 304 are used to generate a fan beam similar to fan beam 104 in FIG. 1. Fan beam 316 is transmitted through interface optics 312 and telescope 315 to the target. Telescope 315 and interface optics 312 enable propagation of fan beam 316 to the far field. Further, these components also collect reflected light in response to the transmission of fan beam 316. This response is referred to as received beam 318, which is transmitted using switch 314 to interface optics 306, streak generator 308, and detector 310.

Interface optics 306 and streak generator 308 are used to "streak" the light in a line relative to detector 310. In other words, streaking of light in a response signal is a shifting of the light with respect to time. As a result, detected light that is received at a later time is shifted with respect to detected light received at an earlier time.

Switch 314 is also referred to as a transmit and receive switch and provides a mechanism to separate transmitted and received beams of light. In this example, switch 314 takes the form of elevation scan mirror 320. Elevation scan mirror 320 may be rotated about axis 322 in the direction of arrows 324. Elevation scan mirror 320 separates fan beam 316 and received beam 318. In this example, the separation involves segregating the beams into non-overlapping subapertures.

Turning next to FIG. 4, another diagram of sensor 300 is depicted in accordance with an advantageous embodiment. In this example, switch 314 employs mirror 400, mirror 402, elevation scan mirror 404, and hole mirror 406 to separate fan beam 316 and received beam 318. In this illustrative example, these components use hole mirror 406 with subaperture 408 for transmission. Surrounding angular subaperture 410 receives received beam 318. In this example, elevation scan mirror 404 may be rotated about axis 412 in the direction of arrows 414.

Turning now to FIG. 5, another diagram of a three-dimensional laser detection and ranging sensor is depicted in accordance with an advantageous embodiment. In this example, switch 314 comprises mirror 500, mirror 502, elevation scan mirror 504, quarter-wave plate 506 and polarization beam splitter 508. Elevation scan mirror 504 may be rotated about axis 510 in the direction of arrows 512 in this example.

Quarter-wave plate 506 and polarization beam splitter 508 are used to separate transmit beam 316 and received beam 318. Quarter-wave plate 506 converts fan beam 316, which takes the form of a linearly polarized transmit beam, into a circularly polarized transmit beam. Quarter-wave plate 506 converts circularly polarized receive beam light into linearly polarized light, which is orthogonally polarized with respect to fan beam 316. Polarization beam splitter 508 separates the transmit and receive beams. Switch 314 distinguishes or separates beams based on the polarizations of those beams.

FIGS. 6-13 describe three illustrative examples of implementations of streak generators. The illustrative example in FIG. 6 describes a streak generation mechanism that focuses the line of light without deflection directly on one row of a frame-transfer sensor. The sensor's movement of detected charge during frame transfer is used to achieve the relative motion required.

Figure 6:
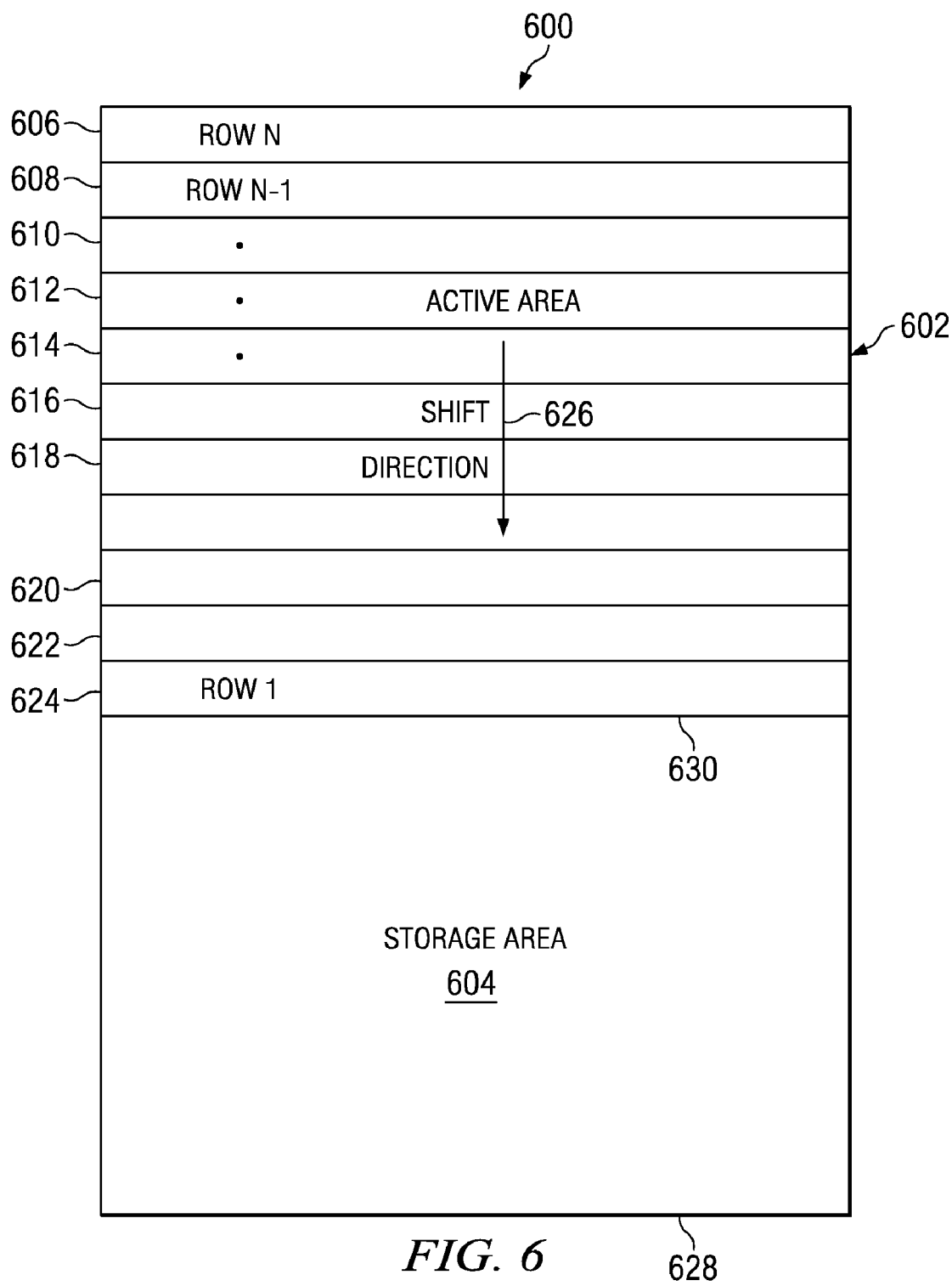
FIG. 6 is a block diagram of a detector in accordance with an advantageous embodiment.

With reference now to FIG. 6, a block diagram of a combined streak generator and detector is depicted in accordance with an advantageous embodiment. In this depicted example, sensor 600 is an example of one implementation for streak generator 308 and detector 310 in FIG. 3. Sensor 600 is a two-dimensional frame transfer charge coupled device, in these examples. In this implementation, streaking of received beam, such as received beam 318 of FIG. 3, is achieved by shifting photosensitive rows within the detector with respect to the received beam, as opposed to shifting the position of the received beam on the detector. Sensor 600 includes active area 602 and storage area 604.

In this embodiment, the functions of streak generation and detection are combined by taking advantage of properties of a specific form of sensor 600. Sensor 600 has a frame transfer architecture. In this case, the received beam is stationary and the electrons generated by photodetection are shifted. In the alternate case described in FIG. 7 below, the received beam is moved.

In this example, sensor 600 is a charge coupled device which provides for frame transfer. Any type of charge coupled device providing this type of functionality may be used. A charge coupled device may include an analog chip register allowing analog signals to be transported through successive stages controlled by a clock signal. This type of device may be used for serializing parallel analog signals, such as those generated by arrays of photo electric light sensors.

An image is collected in active area 602 and stored in storage area 604. In the different advantageous embodiments, the image may be a response signal, such as received beam 318 in FIG. 3. This beam may be in the form of a line or segment, depending on the particular terrain interrogated by the fan beam.

In the different advantageous embodiments, storage area 604 may be created by masking the area with sensor 600 to form storage area 604. In this manner, light is prevented from striking this part of sensor 600. In active area 602, rows 606, 608, 610, 612, 614, 616, 618, 620, 622, and 624 are illustrated. Each of these rows is comprised of an array of sensors or pixels that detect light. Storage area 604 contains similar rows that are not shown in this example. Of course, the number of rows present in sensor 600 may vary depending on the particular implementation.

In these examples, light detected within these different rows is shifted in the direction of arrow 626, which is also referred to as the shift direction. The shifting occurs to move the data into storage area 604. Movement of the entire active area 602 to storage area 604 is referred to as frame transfer. The shifting is different from the streaking or shifting of different segments of a response segment that is projected onto active area 602. In these examples, the segment may illuminate only a single pixel or sensor in a row or multiple sensors within a row.

Normally, light striking pixels in active area 602 during frame transfer introduces image smear. This type of smear is normally undesirable, but is used in some advantageous embodiments to implement the streak generator.

In these examples, the return beam from laser illumination in the far field may fall on row 624, which is considered the first row within active area 602. The other rows may be masked to avoid stray light for this type of imaging.

As frame transfer occurs to move signals from row to row in the shift direction, the charge from photons striking row 624 may appear distributed in the storage area with the last charge from the first return photons being at bottom 628 of storage area 604 and the charge from the last photons being located at top 630 of storage area 604.

In the different examples, a sensor, such as sensor 600, may perform a parallel row transfer with around 12 MHz clocks resulting in about 83 nanoseconds per row in terms of transferring data. This example of transfer provides around a 12.5 meter per pixel range measurement. If the laser pulse is longer than around 83 nanoseconds, the laser pulse may be deconvolved from the return intensity in the post processing to yield improved range resolution.

One example of a chip that may be used to implement sensor 600 is a CCD60 L3Vision electron-multiplied frame-transfer sensor, which is available from E2V Technologies. Another chip that may be used is a Texas Instruments TC237, which is available from Texas Instruments, Incorporated. This type of chip does not provide on-chip amplification prior to the readout electronics, and may require more laser energy due to higher chip readout noise.

In another illustrative example depicted in FIGS. 7-12, the light beam is broken up into beamlets using a lenticular array and re-collimated by a second lenticular array which translates with respect to the focusing array. The ratio of final imaging focal length to collimating lenticular focal length allows the motion to be amplified so that useful streak speeds can be achieved. In this approach, the line of light is deflected by the pair of arrays and scanned across the active area of a two-dimensional detector.

Figure 7:
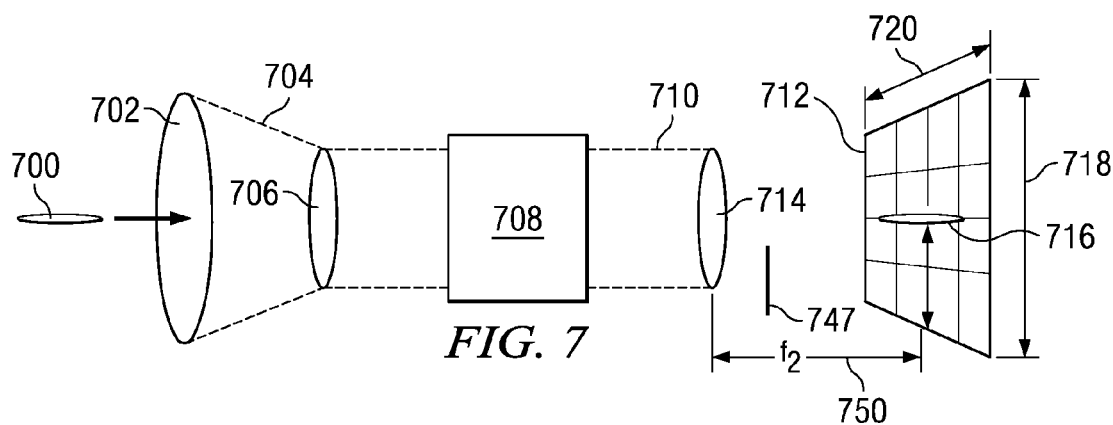
FIG. 7 is a diagram illustrating processing of light from a received beam in accordance with an advantageous embodiment.

Turning now to FIG. 7, a diagram illustrating processing of light from a received beam is depicted in accordance with an advantageous embodiment. In FIG. 7, light segment 700 is from a received beam, such as received beam 318 in FIG. 3, from a line illuminated by fan beam in a far field. Light segment 700 is detected by receiver aperture 702, which may be found in telescope 314 in FIG. 3.

In this example, light segment 700 is a segment of light for a response signal that returns from transmission of a fan beam, such as fan beam 104 in FIG. 1. Different portions of light segment 700 may arrive at different times, depending on the distance of the terrain covered by the fan beam as it interrogates or hits the terrain.

The various interface optics may expand light segment 700 into light beam 704. Light beam 704 may be received by interface optics 706, which may be similar to interface optics 306 in FIG. 3. This beam is then input into streak generator 708, which tilts or "streaks" light beam 704 by an angle proportional to time to form processed beam 710. This beam is then focused onto sensor 712 by focusing lens unit 714 characterized by an effective focal length 750 referred to as f2. Focusing lens unit 714 may be one or more lenses in these examples.

If all of light segment 700 is received or turned in at the same time, then light segment 700 illuminates sensor 712 along line 716. The vertical location on which line 716 illuminates sensor 712 is referred to as the range as indicated by arrows 718. The horizontal location on which line 716 illuminates sensor 712 is referred to as the azimuth as indicated by arrows 720.

Vignetting stop 747 blocks some of the light from near range objects from reaching the detector while allowing all the received light from more distant targets to reach the sensor 712. In these examples, vignetting stop 747 takes the form of an opaque barrier. In this manner the use of vignetting stop 747 reduces the dynamic range of the signal to be measured by the sensor.

Figure 8:
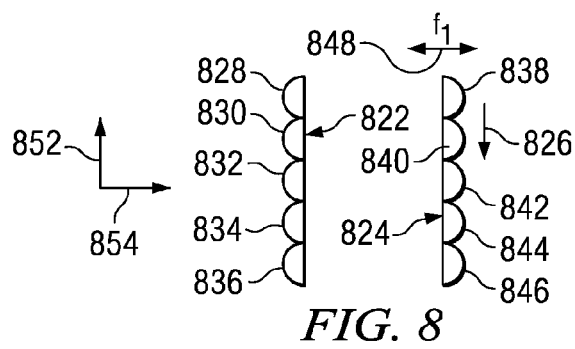
FIG. 8 is an illustration of lens arrays in a streak generator in accordance with an advantageous embodiment.

FIG. 8 is an illustration of lens arrays in a streak generator in accordance with an advantageous embodiment. Streak generator 708 contains focusing lenticular array 822 and collimating lenticular array 824. Focusing lenticular array 822 contains lenses used to focus the light onto an object, such as sensor 712. Collimating lenticular array 824 contains lenses used to generate collimated light. Collimated light is light in which rays are parallel, resulting in a planar wave front.

Collimating lenticular array 824 may move or "translate" along the direction of arrows 826 relative to array 822. Focusing lenticular array 822, in this example, contains cylindrical lenses 828, 830, 832, 834, and 836, shown in cross-section. The long axis of the cylinders in cylindrical lenses 828, 830, 832, 834, and 836 is orthogonal to both the Y-axis 852 and Z-axis 854. Collimating lenticular array 824 contains cylindrical lenses 838, 840, 842, 844, and 846. A portion of light beam 704 may be, for example, sent through lens 830 to lens 840. Each of cylindrical lenses 838, 840, 842, 844, and 846 in collimating lenticular array 824 have a focal length of f1 848.

If portions of light segment 700 are received at different times, the translation of movement of collimating lenticular array 824 may induce a change of direction or tilt in the light being transmitted from lens 830 to lens 840. As a result, that portion of the light is projected onto a different row within sensor 712. Therefore, the translation of movement of collimating lenticular array 824 causes line 716 to be deflected in the range direction. The deflection of line 716 may allow light received at different times to be detected by different rows on sensor 712.

Cylindrical lenses 828, 830, 832, 834, and 836 in focusing lenticular array 822 effectively allow the beam 704 to be decomposed into many beamlets that may be processed in parallel. The ratio of focal length 750 of lens 714 to focal length 848 of collimating lenticular array 824 magnifies the translational motion of collimating lenticular array 824. That is, the motion of line 716 is equal to the motion of the translating array 824 multiplied by the ratio of focal length 750 to focal length 848. The ratio of the focal length 750 to the focal length 848 may be, for example, selected as 200 as a typical value.

Focusing lenticular array 822 and collimating lenticular array 824 may be used to scan the image of light segment 700 across sensor 712. The long dimension of the line corresponds to variations in azimuth. As the image of line 716 is swept perpendicular to the long direction or range as indicated by arrow 718, the different rows of sensor 712 are exposed for a range sampling duration referred to as one range bin.

In other words, each row of sensor 712 may correspond to one range bin in terms of distance with respect to the receipt of line 716. Thus, light reflecting from different ranges fall into different bins or rows within sensor 712. In the different advantageous embodiments, the speed at which line 716 moves may allow the size of the range bin to the selected. The speed of movement of line 716 is referred to as a scan speed in these examples.

In the different advantageous embodiments, the ratio of focal length 750 to focal length 748 may allow large scan speeds to be achieved. For example, a scan speed well in excess of a scan speed provided by a simple rotating mirror may be achieved.

Various mechanisms may be used to move the arrays relative to each other. For example, the motion of collimating lenticular array 724 may be generated by attaching the array to a spinning disk.

Another manner may be to fabricate collimating lenticular array 724 as a flexible array mounted on a moving belt. Yet another example may be to mount collimating lenticular array 724 on an electromechanical translation stage. Materials such as those used in the printing industry to provide images that change as a function of viewing also may be used.

Timing of the scan of line 716 may be achieved by synchronizing the start of the scan to the transmission of the fan beam 318 in FIG. 3. Data processing system 214 of FIG. 2, for example, may initiate the fan beam 318 in FIG. 3 transmission, then wait a fixed interval, then initiate the scan of line 716. In another example, the time of transmission of fan beam 318 in FIG. 3 may be detected by a photo detector and may used to initiate the scan of line 716 after an appropriate delay.

A further method of synchronizing the scan of line 716 may be to pass a small collimated optical beam through an otherwise unused portion of the lenticular arrays, and detect the light with a lens and photodiode. The detected signal can be used as a timing signal to synchronize the motion of the lenticular arrays to the initiation of the transmission of fan beam 318 in FIG. 3.

The delay between the transmission of fan beam 318 in FIG. 3 and the start of the scan of line 716 may be controlled to limit optical detection of the light segment 700 to light reflecting only from targets between a minimum and maximum range, referred to as a range gate. Limiting detection of light to a specific range gate prevents the undesirable detection of light scattered from targets or atmosphere lying outside of the range gate.

A method of real-time calibration of the range measurements produced by laser detection and ranging system 202 may be implemented by illuminating one end of a fiber optic cable with a small fraction of the transmitted laser energy. The other end of the fiber cable may be inserted at the edge of a focal plane in telescope 315 in FIG. 3 or interface optics 312 in FIG. 3 such that the outgoing laser pulse is delayed by the length of the fiber cable appears on an edge column of pixels in the final detector.

The edge pixel row in this configuration corresponds to a range which is the length of fiber multiplied by the index of refraction of the fiber. With fiber beam splitters and combiners the fiber may have several apparent lengths, or the total length of fiber in the path could be adjusted between individual measurements using switches.

Sensor 712 may be selected to achieve detection of the wavelength of light transmitted in light beam 704. One example of a chip that may be used to implement sensor 712 is a TC247 Impactron, which is an electron-multiplied frame interline transfer charged coupled device image sensor. This sensor is available from Texas Instruments, Incorporated. Another example of a charge coupled device that may be used is a CCD60 L3Vision electron-multiplied frame-transfer sensor, which is available from E2V Technologies.

Another chip that may be used is a Texas Instruments TC237, which is also available from Texas Instruments, Incorporated. This type of chip does not provide on-chip amplification prior to the readout electronics, and may require more laser energy due to higher chip readout noise. Yet another example is a Kodak KAI-0340 interline transfer charge coupled device. This device is available from Eastman Kodak Co.

Figure 9:
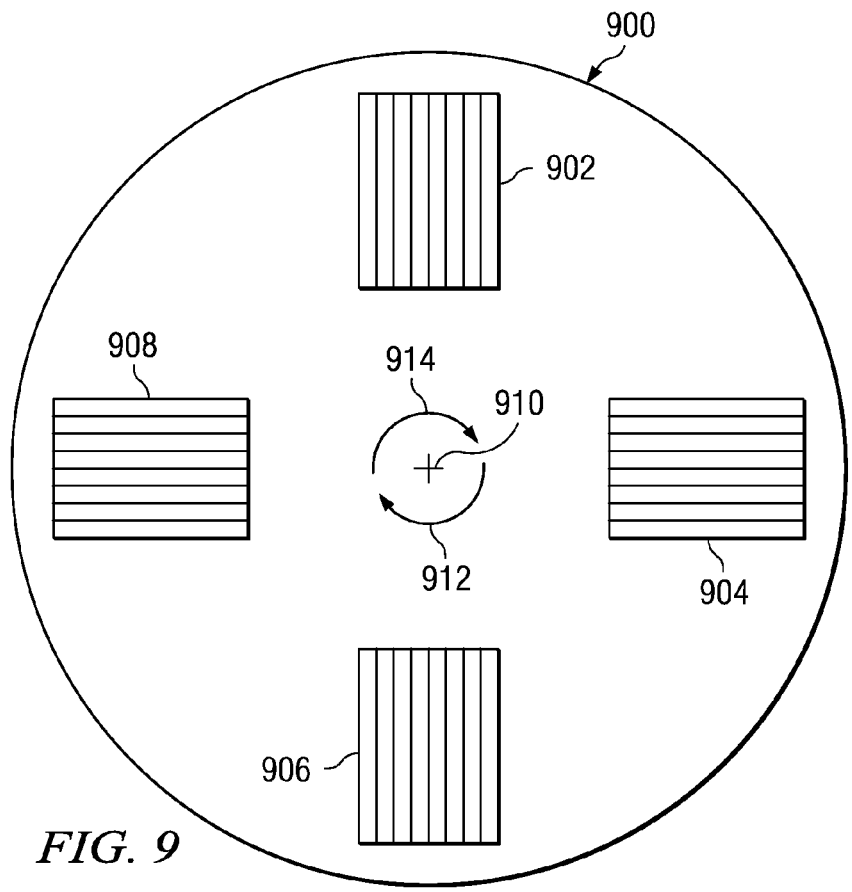
FIG. 9 is a diagram illustrating a method of creating relative motion between lenticular arrays in accordance with an advantageous embodiment

Turning now to FIG. 9, a diagram illustrating an approach for translating collimating lenticular array 824 in FIG. 8 is depicted in accordance with an advantageous embodiment. In this example, collimating lenticular array 824 in FIG. 8 is implemented with a set of elements, in this example four, spaced about the periphery of a rotating disk. A single focusing lenticular array 822 in FIG. 8 remains stationary. Rotation of the disk may allow the collimating arrays to rotate through an optical path containing the stationary focusing lenticular array 822 in FIG. 8 to achieve the relative translational motion between the arrays.

In another advantageous embodiment, focusing lenticular array 822 and collimating lenticular array 824 in FIG. 8 are each mounted on a disk as in FIG. 9, and the pair of disks rotate in opposing directions to achieve the relative translational motion between the arrays.

In FIG. 9, mounting disk 900 has collimating lenticular arrays 902, 904, 906, and 908. Mounting disk 900 may rotate about center 910 in a direction as indicated by arrows 912 and 914.

Figure 10:
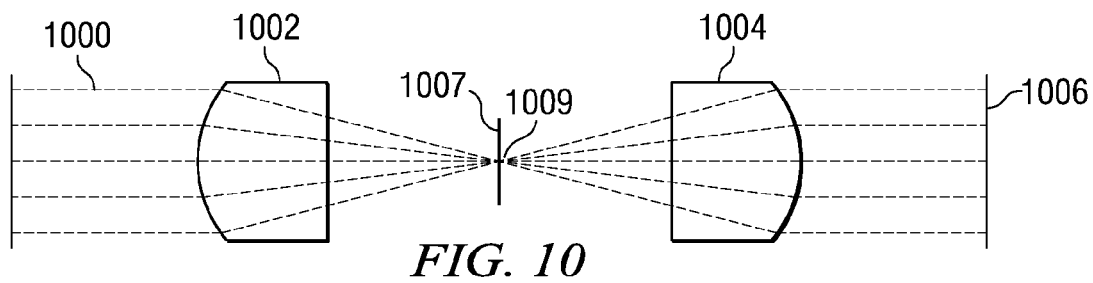
FIGS. 10-12 are illustrations of the manner in which a streak generator shifts light with respect to when light is received from a fan beam in accordance with an advantageous embodiment.
Figure 11:
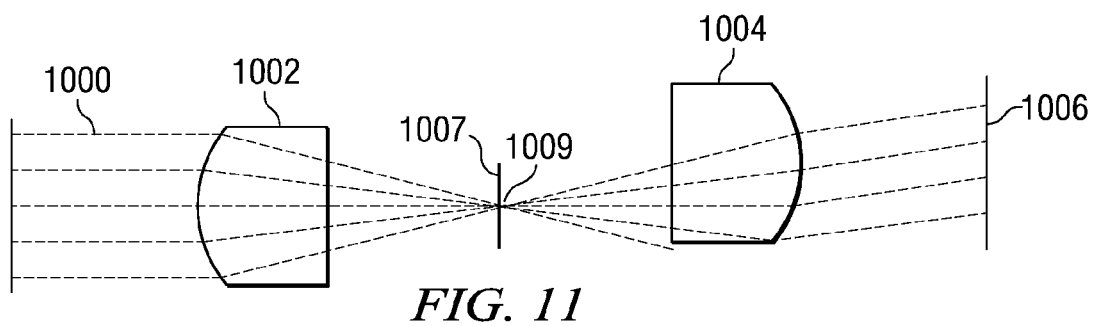
Figure 12:
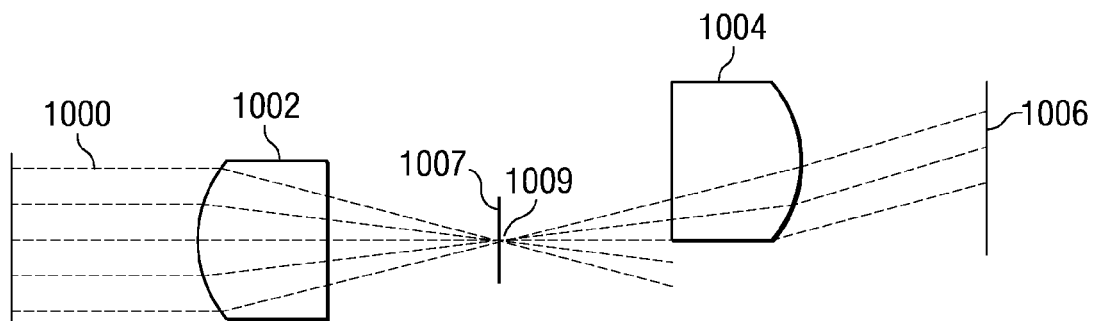

Turning now to FIGS. 10-12, an illustration of the manner in which focusing lenticular array 822 and collimating lenticular array 824 in FIG. 8 shift light with respect to when light is received from a fan beam is depicted in accordance with an advantageous embodiment. In FIG. 10, beam 1000 is sent into lens 1002. Lens 1002 is the lens within a focusing lenticular array, such as focusing lenticular array 822 in FIG. 8. Lens 1002 brings light beam 1000 to a focus at plane 1007. Plane 1007 is also the focal plane of lens 1004, which is a lens within a collimating lenticular array, such as collimating lenticular array 824 in FIG. 8.

In this example, lens 1002 focuses collimated light in light beam 1000. Lens 1004 collects and re-collimates the light into beam 1006. The focal planes of lens 1002 and lens 1004 are coincident at plane 1007. In FIG. 11, lens 1004 has shifted as compared to the position of lens 1004 in FIG. 10. This shift causes a shift in the angle of propagation of beam 1006. In FIG. 12, lens 1004 has further shifted vertically causing an additional shift in the propagation direction of beam 1006.

Thus, as the different arrays are translated perpendicular to both the optical axis and the cylindrical lens axis, the output beam is tilted as shown in FIGS. 11-12 relative to the aligned position of FIG. 10. The shift illustrated in these figures may cause beam 1000 to illuminate a different row within sensor 712 in FIG. 7.

Some of the light from beam 1000 in the offset configuration between lenses 1002 and 1004 does not pass through lens 1004. Instead, this light may pass through another lens within the collimating lenticular array to produce a second, undesirable, tilted output beam. The second output beam is projected from a lens other than lens 1004 resulting in the beam being projected onto a different portion of sensor 712 in FIG. 7.

Figure 13:
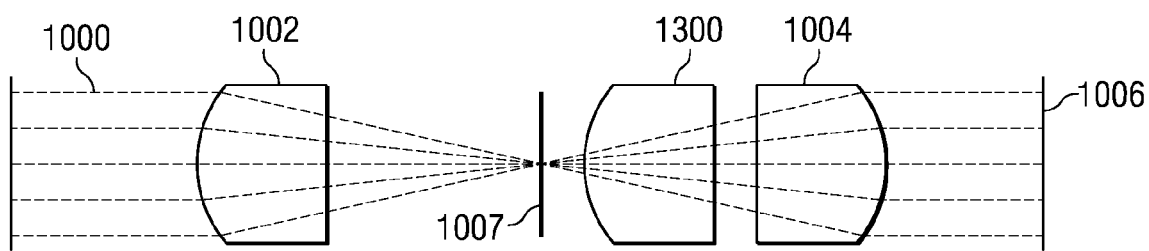
FIG. 13-14 are diagrams illustrating an arrangement of lenses in a streak generator in accordance with an advantageous embodiment.

Turning now to FIG. 13, a diagram illustrating an arrangement of lenses in a streak generator is depicted in accordance with an advantageous embodiment. In FIG. 13, an additional field lenticular array is inserted as illustrated shown by lens 1300. This lens is inserted at or around focal plane 1007 and acts as a field lens to reimage light from lens 1002 onto lens 1004 such that all of the light goes through the intended section of the lenticular array. With this type of implementation, all of beam 1000 focused by lens 1002 may be guided through lens 1004 to produce a single tilted output beam.

Figure 14:
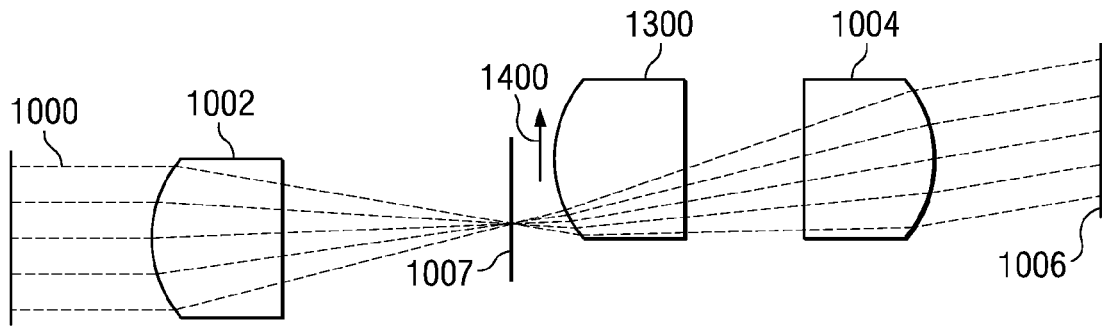

In FIG. 14, lens 1300 and lens 1004 have been translated upward along the direction of arrow 1400 as compared to FIG. 13. The amount of translation may be similar to that illustrated in FIG. 12. Even with this translation, all of beam 1000 is still focused through lens 1004 with the use lens 1300. As a result, all of beam 1000 is passed through lens 1004 using the configuration with lens 1300.

In an embodiment with three arrays illustrated in FIGS. 13-14, the intermediate field lenticular array may be implemented as a set of elements, in this case four, and mounted together with the collimating lenticular arrays 902, 904, 906, and 908.

Figure 15:
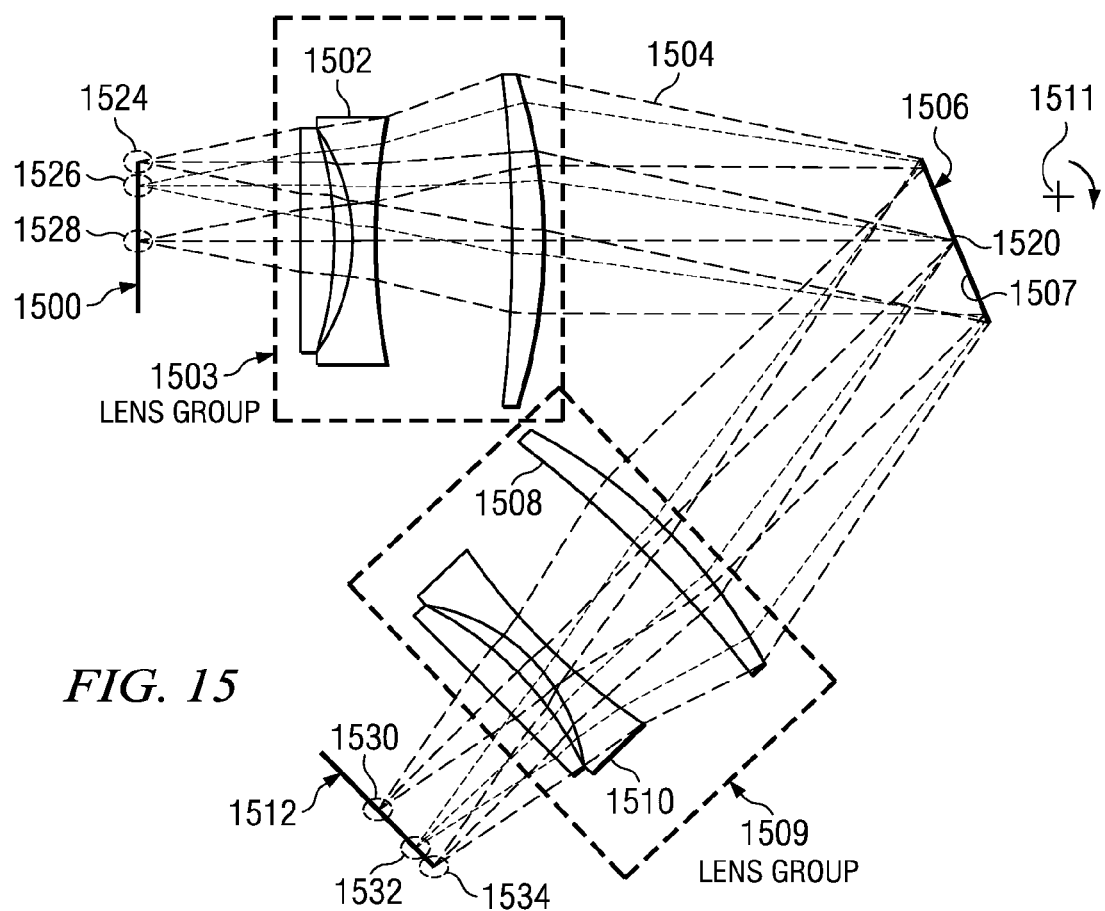
FIG. 15 is a diagram illustrating an optical path for use in a streak generator in accordance with an advantageous embodiment.

In another illustrative example described in FIG. 15, a rotating mirror is inserted in an optical relay path between the lenticular arrays instead of moving the lenticular arrays relative to each other. In FIG. 15, an alternate architecture using lenticular arrays is depicted.

With reference now to FIG. 15, a diagram illustrating an optical path for use in a streak generator is depicted in accordance with an advantageous embodiment.

This figure illustrates another approach to inducing beam tilt to perform streaking. In this embodiment, beam tilt is created using a rotating mirror between stationary lenticular arrays, rather than by relative motion of one array with respect to another. This figure illustrates optical propagation from focal plane 1500 of focusing lenticular array 822 to focal plane 1512 of collimating lenticular array 824 in FIG. 8.

In this example, lens group 1503, and lens group 1509 comprise an optical relay system, which recreates the optical intensity at focal plane 1500 at the output plane 1512. The propagation of light from three foci, foci 1524, foci 1526 and foci 1528, corresponding to three input lenticular array elements, to three foci, foci 1530, foci 1532, and foci 1534, of three output lenticular array elements is illustrated.

In this example, tilt mirror 1506 may be used to cause a lateral shift in the beam at plane 1512 with respect to the beam at focal plane 1500 by changing the tilt or angle of tilt mirror 1506 about axis 1511. This type of system for directing the beam at focal plane 1500 may be symmetric about mirror face 1507 for tilt mirror 1506. Tilt mirror 1506 may be one face of a polygon scanner, such as a LB5-6 available from Lincoln Laser Corp.

The two lens groups, lens group 1503 and lens group 1509 may also be designed to minimize the aberrations in the direction orthogonal to the lenticular focus lines so that the final image at the detector maintains resolution in the azimuth direction.

Although three examples of streak generation mechanisms have been shown, these examples are not meant to limit the manner in which streak generation may be implemented. Other types of streak generation mechanisms may be used in other advantageous embodiments. For example, a streak generator based on electrostatic deflection methods may be used.

Figure 16:
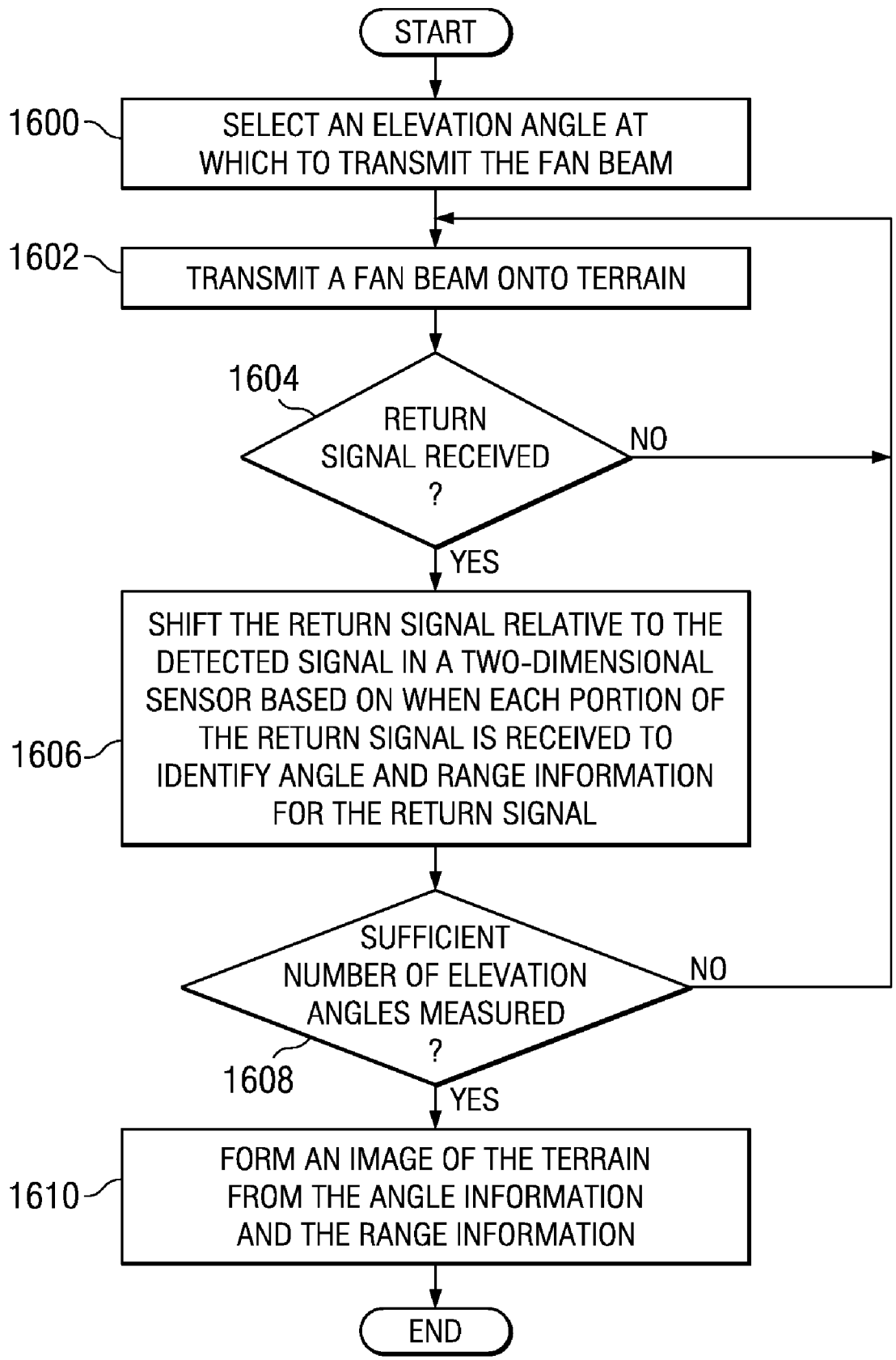
FIG. 16 is a flowchart of a process for generating angle and range information about terrain in accordance with an advantageous embodiment.

With reference now to FIG. 16, a flowchart of a process for generating angle and range information about terrain is depicted in accordance with an advantageous embodiment. The process illustrated in FIG. 16 may be implemented in a laser detection ranging system, such as laser detection and ranging system 202 in FIG. 2.

The process begins by selecting an elevation angle at which to transmit the fan beam (operation 1600). Thereafter, the fan beam is transmitted onto terrain (operation 1602). Thereafter, a determination is made as to whether the return signal has been received (operation 1604). If a return signal has not been received, the process returns to operation 1602.

Otherwise, the process shifts the return signal based on when each portion of the return signal is received onto a two-dimensional sensor to identify angle and range information for the return signal (operation 1606). Operation 1606 allows the sensor to discriminate against or exclude irrelevant returns caused by light scattered from sources other than the terrain or objects to be measured. In this manner, measurement of targets partially obscured by intervening scattering surfaces, such as foliage, may be accomplished.

Thereafter, a determination is made as to whether a sufficient number of elevation angles have been measured to comprise a complete image (operation 1608). If the image is not complete, the process returns to operation 1602. Otherwise, the process forms an image of the terrain from the angle information and the range information (operation 1610), with the process terminating thereafter. With this information, various components of the vehicle may be controlled using the angle information and range information. For example, the movement of the vehicle may be controlled as well as other devices, such as cameras, robotic arms, and weapons.

Thus, the different advantageous embodiments provide a method and apparatus for obtaining information about terrain. This information for terrain may be located around a vehicle. In the different advantageous embodiments, an apparatus may include a fan beam generation unit, a detector, and a streak unit. The fan beam generation unit is capable of transmitting a laser beam in the form of a fan onto a terrain. The detector has rows of sensors that are capable of detecting a response signal detected in response to the transmission of the laser beam. The streak unit projects different portions of the response signal onto different rows of the detector in response to the different portions of the response signal being received at different times.

The information from the detector may be used to identify range and angle data with respect to the response signal. For example, a two dimensional image may be produced in which range is encoded as either intensity or color hue and displayed as a function of elevation and azimuth. As another example, this same data may be rendered as a three-dimensional volume to convey the relationship between measured range and viewing angle. As another example, measured return intensity may be encoded as intensity and range encoded as color with both range and intensity being functions of azimuth and elevation, and a three-dimensional volumetric rendering of the scene may be produced.

The description of the different advantageous embodiments has been presented for purposes of illustration and description, and is not intended to be exhaustive or limited to the embodiments in the form disclosed. Many modifications and variations will be apparent to those of ordinary skill in the art.

Although the different advantageous embodiments have been described with respect to ground vehicles and terrain, the different advantageous embodiments may be applied to other identifying objects in environments around other types of vehicles. Of course, the different advantageous embodiments may be applied to detecting objects environments other than terrain. For example, in a water environment, the objects may be other vessels and/or land masses.

For examples, maritime vessels, such as naval ships, and low-flying aircraft, such as rotorcraft, detect and identify other ships and objects with a viewing geometry similar to that for ground vehicles. Further, hand-held sensors and sensors that are stationary, as on a building, may also share the same viewing geometry. This, the different advantageous embodiments also may be applied to stationary or handheld sensors.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A laser detection and ranging system for a vehicle, the laser detection and ranging system comprising:
   a fan beam generation unit capable of transmitting a fan beam;
   a streak unit capable of streaking a received beam generated in response to the fan beam to form a streaked beam, wherein the streak unit comprises a focusing lenticular array and a collimating lenticular array and a mechanism to move the focusing lenticular array and the collimating lenticular array relative to each other;
   a telescope capable of propagating the fan beam to a portion of an environment around the vehicle;
   a switch capable of directing the fan beam generated by the fan beam generation unit through the telescope along an azimuth onto the environment around the vehicle and directing a response signal to the fan beam to the streak unit; and
   a detector unit capable of detecting the streaked beam and generating range and angle data to generate an image of the environment.

2. The laser detection and ranging system of claim 1, wherein the vehicle is selected from a group comprising a ground vehicle and a water vehicle.

3. An apparatus comprising:
   a fan beam generation unit capable of transmitting a laser beam in a form of a fan onto an environment;
   a detector having a plurality of rows of sensors capable of detecting a response signal generated in response to transmitting the laser beam onto the environment;
   a streak unit capable of projecting different portions of the response signal onto different rows of the detector in response to the different portions of the response signal being received at different times, wherein the streak unit comprises a focusing lenticular array and a collimating lenticular array and a mechanism to move the focusing lenticular array and the collimating lenticular array relative to each other; and
   a data processing system capable of generating range and angle data from the response signal detected by the detector.

4. The apparatus of claim 3, wherein the data processing unit is capable of forming an image of the environment interrogated by the laser beam.

5. The apparatus of claim 4 further comprising:
   a mobile platform, wherein a program executing on the data processing system is capable of directing movement of the mobile platform using the image of the environment.

6. The apparatus of claim 5 further comprising:
   a device mounted on the mobile platform, wherein the program is capable of controlling operation of the device using the image of the environment.

7. The apparatus of claim 4 further comprising:
   a mobile platform, wherein the data processing system transmits the image of the environment to a remote operator of the mobile platform and wherein the remote operator controls movement of the mobile platform using the image of the environment.

8. The apparatus of claim 7 further comprising:
a device mounted on the mobile platform, wherein the remote operator controls operation of the device using the image of the environment.

9. The apparatus of claim 3, wherein the streak unit comprises a focusing lenticular array, a field lenticular array and a collimating lenticular array and a mechanism to move of moving the focusing lenticular array relative to the collimating lenticular array and the field lenticular array.

10. The apparatus of claim 3, wherein the streak unit comprises a pair of lenticular arrays, an optical relay system, and a tilting mirror.

11. The apparatus of claim 3, wherein the streak unit is combined with the detector and the detector is a frame-transfer charge coupled device.

12. The apparatus of claim 7, wherein the mobile platform is selected from a group comprising a ground vehicle and a water vehicle.

13. The apparatus of claim 8, wherein the device is selected from a group comprising a video camera, a robotic arm, and a gun turret.

14. A method for forming an image terrain, the method comprising:
transmitting a fan beam onto a terrain;
responsive to receiving a return signal from the fan beam, shifting the return signal based on when each portion of the return signal is received onto a two-dimensional sensor to identify angle and range information for the return signal from the fan beam, wherein the shifting step comprises:
passing the return signal from the fan beam through a focusing lenticular array and a collimating lenticular array; and
forming an image of the terrain from the angle and range information.

15. The method of claim 14, wherein transmitting step comprises:
transmitting the fan beam with an azimuth onto the terrain with different elevations.

16. The method of claim 14, wherein the shifting step comprises:
passing the return signal from the fan beam through a focusing lenticular array, a field lenticular array, and a collimating lenticular array.

17. The method of claim 14, wherein the shifting step comprises:
passing the return signal from the fan beam through a focusing lenticular array, an optical relay, a tilt mirror and a collimating lenticular array.

18. The method of claim 14, wherein the shifting step comprises:
illuminating a two-dimensional frame transfer charge coupled device during frame transfer.

* * * * *